United States Patent [19]

Malec

[11] 4,120,803

[45] Oct. 17, 1978

[54] LUBRICANT COMPOSITION CONTAINING A DISPERSANT WHICH IS A CONDENSATION PRODUCT OF A COPOLYMER, POLYAMINE AND A POLYCARBOXYLIC ACID

[75] Inventor: Robert E. Malec, Birmingham, Mich.

[73] Assignee: Ethyl Corporation, Richmond, Va.

[21] Appl. No.: 741,782

[22] Filed: Nov. 15, 1976

[51] Int. Cl.² .................... C10M 1/36; C10M 3/30
[52] U.S. Cl. .............................. 252/51.5 A; 260/879
[58] Field of Search .................. 252/51.5 A; 260/879

[56] References Cited

U.S. PATENT DOCUMENTS

| | | |
|---|---|---|
| 2,568,876 | 9/1951 | White et al. ..................... 252/51.5 A |
| 2,908,649 | 10/1959 | Cunningham et al. .......... 252/51.5 A |
| 3,216,936 | 11/1965 | Le Suer ........................... 252/51.5 A |
| 3,373,111 | 3/1968 | Le Suer et al. .................. 252/51.5 A |
| 3,374,174 | 3/1968 | Le Suer ........................... 252/51.5 A |
| 3,455,827 | 7/1969 | Mehmedbasich ............... 252/51.5 A |
| 3,539,603 | 11/1970 | Clough ............................ 252/51.5 A |

FOREIGN PATENT DOCUMENTS 1,058,672  6/1959  Fed. Rep. of Germany ..... 252/51.5 A

*Primary Examiner*—Delbert E. Gantz
*Assistant Examiner*—Joan Thierstein
*Attorney, Agent, or Firm*—Donald L. Johnson; Robert A. Linn; Joseph D. Odenweller

[57] ABSTRACT

Mono-alkenes, aliphatic conjugated dienes and unsaturated fatty acids or esters thereof copolymerize with a Friedel-Crafts catalyst to yield a copolymer containing carboxylic acid or ester groups which are reacted with a polyamine to amidate the carboxyl group leaving free amine groups. The free amine groups are reacted with polycarboxylic acids to form inter- and intra-molecular bridged polyamides. These compounds are effective ashless dispersants in lubricating oil and have detergency properties in distillate fuels.

18 Claims, No Drawings

LUBRICANT COMPOSITION CONTAINING A DISPERSANT WHICH IS A CONDENSATION PRODUCT OF A COPOLYMER, POLYAMINE AND A POLYCARBOXYLIC ACID

BACKGROUND

Ashless dispersants are generally included in lubricating oil intended for use in internal combustion engines. Such ashless dispersants are especially effective at low temperatures. Likewise, such dispersants are used in distillate fuels such as gasoline, jet fuel, fuel oil and the like to clean and maintain cleanliness in carburetors and intake passages of internal combustion engines and in diesel injectors and burner nozzles.

A very effective class of ashless dispersants are the amidated copolymer of mono-1-alkenes, conjugated diolefins and unsaturated fatty acids. Such dispersants are described in U.S. Pat. Nos. 3,483,125 and 3,647,731. The present additives are modifications of these materials which have improved dispersancy properties in lubricating oils.

SUMMARY

According to the present invention there is provided an ashless dispersant for lubricating oil which is made by copolymerizing a mono-alkene, an aliphatic conjugated diene and an unsaturated fatty acid or ester thereof to form an intermediate copolymer which is amidated by reaction with a hydrocarbyl polyamine. The product is then reacted with an aliphatic or aromatic polycarboxylic acid to form inter- and intramolecular bridges between residual amine groups of the polyamine.

DESCRIPTION OF THE PREFERRED EMBODIMENTS

A preferred embodiment of the invention is an oil soluble lubricating oil dispersant which is a condensation product of (A) a copolymer of (i) about 3 to 55 mole percent of a material having the formula

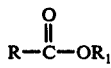

wherein R is an olefinically-unsaturated hydrocarbon radical of 2 to about 25 carbon atoms and $R_1$ is selected from the group consisting of hydrogen and alkyl radicals containing 1 to about 15 carbon atoms, (ii) about 5 to 80 mole percent of a conjugated diethylenically unsaturated aliphatic hydrocarbon of 4 to about 12 carbon atoms, and (iii) about 92 to 15 mole percent of a mono-alkene of 3 to about 30 carbon atoms, said material and said mono-alkene being selected such that the total number of carbon atoms in these compounds is at least about 12, (B) a hydrocarbyl polyamine containing from 2 to about 12 carbon atoms and from about 2 to about 7 amine nitrogen atoms, and (C) a polycarboxylic acid selected from the group consisting of (i) aliphatic dicarboxylic acids containing 2 to about 12 carbon atoms and (ii) aromatic polycarboxylic acids containing an aryl group of about 6-10 carbon atoms and having 2 to 3 carboxylic groups bonded to said aryl group, said aliphatic dicarboxylic acid and aromatic polycarboxylic acid including precursor compounds which yield said aliphatic dicarboxylic acid and said aromatic polycarboxylic acid under reaction conditions.

The copolymers of (A) above and the amidated product formed by the condensation of (A) with the polyamine of (B) are known. Their preparation using mono-1-alkenes is described in U.S. Pat. No. 3,483,125 and 3,647,731, both of which are incorporated fully herein by reference. The following discussion is intended to supplement the extensive teaching of the above-cited patents on how to make the copolymers and their amides.

The copolymer (A) can be readily made by polymerizing a mixture of mono-alkenes, unsaturated fatty acids or esters, and aliphatic conjugated dienes. The reaction is conducted in the presence of a suitable polymerization catalyst. Good results are achieved using a Friedel-Crafts catalyst. Examples of such catalysts are aluminum chloride, aluminum bromide, boron fluoride, stannic chloride, and the like. The preferred catalyst is aluminum chloride.

The polymerization is preferably carried out in a solvent. Good results are achieved using a lower alkyl halide solvent such as a $C_{1-4}$ alkyl bromide or chloride. A preferred solvent is ethyl chloride.

The polymerization catalyst may be dissolved in the solvent and the catalyst solution added to the monomer mixture or the monomer mixture added to the solvent and catalyst. Preferably, the monomers and catalyst solution are concurrently added to a polymerization zone.

The amount of solvent can vary widely. A useful range is about 0.5–5 volumes of solvent per volume of comonomers.

The polymerization is conducted at a temperature high enough to cause the polymerization to occur at a reasonable rate. A useful temperature range is about 0°–50° C. When conducted in a lower alkyl halide solvent, a facile method of conducting the reaction is to conduct it at the boiling point of the solvent using reflux to remove heat and thereby control temperature.

The mole ratio of comonomers can vary widely. A useful mole ratio of comonomers is about 3 to 55 percent unsaturated fatty acid, about 5 to 80 percent diene, and about 92 to 15 mole percent mono-alkene. The mole percentage is based upon the total moles of the three comonomers used in the polymerization. The specific comonomer mixture is made such that its composition falls within the above range. Naturally, the percent of each comonomer is such that the total does not exceed 100 percent.

The amount of polymerization catalyst should be an amount that causes the polymerization to proceed at a reasonable rate under the particular reaction conditions. With Friedel-Crafts catalysts, such as aluminum chloride, good results can be obtained using about 0.1 to about 20 weight percent catalyst based upon the weight of the polymer. A preferred amount is about 2 to 15 weight percent catalyst plus any additional amount of the catalyst which complexes with the unsaturated fatty acid used in the system.

The unsaturated fatty acids used in the reaction can be represented by the formula

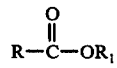

in which R is an olefinically-unsaturated hydrocarbon radical of 2 to about 25 carbon atoms and $R_1$ is hydrogen in the case where the acid form is used or $C_{1-15}$ alkyl when the ester form is used. Examples of such unsaturated fatty acids are acrylic acid, methyl acrylate, n-butyl methacrylate, n-octyl crotonate, sec-pentadecyl vinylacetate, linoleic acid, tall oil fatty acids, soya fatty acids and the like. The more preferred unsaturated fatty acids are those in which the carboxyl grop is separated from all olefinic bonds in R by at least 2 carbon atoms. Examples of these preferred unsaturated fatty acids or esters are vinylacetic acid, methyl vinylacetate, isooctyl vinylacetate, $\beta$-hexenoic acid, methyl-$\beta$-hexenoate, oleic acid, methyl oleate, ethyl oleate, isopropyl oleate, n-decyl oleate, sec-dodecyl oleate, isopentadecyl oleate, elaidic acid, methyl elaidate, amyl elaidate, erucic acid, methyl erucate, brassidic acid, methyl brassidate, isobutyl brassidate, isodecyl brassidate, linoleic acid, sec-dodecyl brassidate, tall oil acids, soya fatty acids and the like.

The most preferred unsaturated fatty acid is oleic acid, especially in its ester form, such as methyl oleate, ethyl oleate, n-propyl oleate, isopropyl oleate, n-butyl oleate, isobutyl oleate, n-hexyl oleate, 2-ethylhexyl oleate, isooctyl oleate, 2-ethyldecyl oleate, isopentadecyl oleate, and the like. The most preferred unsaturated fatty acid reactant is methyl oleate.

A secondary component in the preparation of the copolymer is a conjugated diethylenically unsaturated aliphatic hydrocarbon of 4–12 carbon atoms. These are referred to herein as conjugated diene or simply dienes. Examples of such compounds are butadiene, isoprene(2-methylbutadiene), 2,3-dimethylbutadiene, 1,3-pentadiene, 1,3-hexadiene, 2,5-dimethyl-2,4-hexadiene, 1,3-dodecadiene, and the like. The preferred dienes are 1,2-butadiene and isoprene, especially 1,3-butadiene.

The third copolymer is a $C_{3-30}$ mono-alknene. These are mono-olefinically unsaturated aliphatic hydrocarbons containing 3 to 30 carbon atoms. Examples of these are propylene, isobutylene, butene-2, dodecene-1, 2-ethylhexene-2, 2,4-diethyldecene-3, eicosene-1, 2-ethyl-eicosene-2, 2-ethyldocosene-4, pentacosene-2, triacontene-1 and the like.

Preferably, mono-alkenes contain at least 20 mole percent mono-1-alkenes or terminal olefins including both linear and branched chain terminal olefins. Examples of these are propylene, butene-1, isobutylene, 2-methylbutene-1, 3,4-dimethylpentene-1, 2-ethyloctene-1, 2-ethyldecene-1, dodecene-1, tetradodecene-1, 2-methyloctene-1, 2-n-propyldocosene-1 and the like.

The more preferred mono-1-alkenes are the linear mono-1-alkenes such as n-butene-1, n-decene-1, n-dodecene-1, n-tetradecene-1, n-hexadecene-1, n-octadecene-1, n-eicosene-1, and the like.

Still more preferred mono-alkenes contain at least 35 mole percent mono-1-alkenes, the balance of the olefins being internal olefins. The mono-alkenes can be used as individual compounds, but are generally used as mixtures of several mono-alkenes. Frequently, the mono-alkene mixture contains inert diluents such as saturated aliphatic hydrocarbons. For example, one especially useful mono-alkene consists essentially of about 75–85 mole percent mono-alkenes and 15–25 mole percent paraffins. Both the mono-alkenes and paraffins containing from about 12 to 26 carbon atoms.

The copolymer (A) is amidated by reaction with an aliphatic polyamine containing 2 to about 12 carbon atoms and 2 to about 7 amine groups, at least 2 of such amine groups having at least one hydrogen atom bonded to the amine nitrogen such that they can react with carboxylic acid type compounds to form amides. These include polyamines such as 1,3-propanediamine, 1,6-hexamethyldiamine, 1,2-diaminopropane, 1,2-diaminododecane and the like.

An especially preferred class of aliphatic polyamines are the polyalkylene polyamines which contain from 1 to about 6 alkylene units of 2-4 carbon atoms each and about 2-7 amine groups, each of the alkylene units being bonded to an amine group and at least 2 of the amine groups having a hydrogen atoms bonded to the amino nitrogen capable of forming an amide. Examples of such polyalkylene polyamines are ethylene diamine, diethylene triamine, triethylene tetramine, tetraethylene pentamine, pentaethylene hexamine, propylene diamine, dipropylene triamine, tripropylene tetramine, butylene diamine, dibutylene triamine, tributylene tetramine and the like. Such polyalkylene polyamines can be made by reacting a dibromo or dichloro alkane with ammonia. For example, ethylene dichloride (1,2-dichloroethane) reacts with ammonia to form a mixture of polyethylene polyamines which may be separated by distillation. Such mixtures also includes cyclic polyethylene polyamines such as piperazine, N-aminoethyl piperazine and the like, which compounds are also considered as polyalkylene polyamines herein.

The polyamines can be used as single compounds or as mixtures of different polyamines. For example, mixtures of polyethylene polyamines such as mixtures of diethylene triamine, triethylene tetramine, tetraethylene pentamine and pentaethylene hexamine are very useful and highly preferred.

The amount of polyamine (B) used in the amidation should be such that after amidation of the carboxyl groups of copolymer (A) there remains at least sufficient >NH groups to enter into amide formation in a subsequent reaction with a polycarboxylic acid compound. In general, there should be at least 1.1 equivalents of polyamine per equivalent of carboxylic acid or ester in copolymer (A). An equivalent of polyamine is the average molecular weight divided by the average number >NH groups per molecule. For example, the equivalent weight of triethylene tetramine is the molecular weight, 146, divided by the number of >NH groups, 4, which gives an equivalent weight of 36.5. The equivalent weight of copolymer (A) is the average molecular weight of the copolymer divided by the average number of carboxyl groups per molecule. This can be readily estimated by dividing the total weight of reactive monomers by the number of moles of unsaturated fatty acid or ester used to make the copolymer.

More preferably there is used at least 2 equivalents up to about 10 equivalents of polyamine per equivalent of carboxylic acid or ester. In practice the most preferred amount of polyamine is that which provides 1 to about 2 equivalents of terminal —NH$_2$ groups per carboxyl group.

Polyamine (B) is condensed with copolymer (A) by mixing the two and heating the mixture to about 60°–320° C. A preferred temperature range is about 190° to 260° C. Water or alcohol distill out during the amidation depending upon whether the carboxyl group is in acid or ester form.

Following the amidation there remains in the amidated copolymer unreacted >NH groups since the equivalents of >NH groups exceed the equivalents of carboxyl groups in the copolymer. It has been found that the dispersancy and other properties of the amidated copolymer are substantially improved by coupling such unreacted >NH groups by reaction with a polycarboxylic acid yielding compound. By this is meant a polycarboxylic acid or a compound which will react with an >NH group to form an amide bond such as is produced by reacting a carboxylic acid with an amine. Examples of such compounds are those in which the carboxylic group is a carboxylic ester group or an acid halide groiup

in which X is halogen such as chlorine or bromine.

The polycarboxylic acid compound may be an aliphatic dicarboxylic acid. Of these the preferred contain about 2 to 12 carbon atoms. Examples of such compounds are oxalic acid, malonic acid, succinic acid, glutaric acid, adipic acid, pinelic acid, suberic acid, azelaic acid, sebacic acid, brassic acid and the like.

Optionally, esters of these dicarboxylic acids can be employed. In this event, the lower alkyl esters are preferred such as the corresponding methyl, ethyl, propyl, isopropyl, n-butyl, isobutyl and the like esters.

If desired, the acid halide of the above dicarboxylic acids can be used such as oxalyl dichloride, succinyl dibromide, adipyl dichloride and the like.

Unsaturated aliphatic dicarboxylic acids can be used, but are not preferred. Examples of these are maleic acid, fumaric acid and the like.

The dicarboxylic acid may be substituted with a hydrocarbon group, for example, a polyolefin group of 50-5000 molecular weight. An example of such is an alkenyl succinic acid in which the alkenyl group has a molecular weight of about 50-5000. These are readily made by reacting an olefin with maleic acid or anhydride at temperatures of about 180°-225° C. For example, propene tetramer reacts with maleic anhydride to form tetrapropenyl succinic anhydride. Likewise, polyisobutylene (mw 1000) reacts with maleic anhydride to form polyisobutylene succinic anhydride, a useful coupling agent.

Aromatic polycarboxylic acid, esters, or acid halides can be used in place of the aliphatic dicarboxylic acid. Of these the preferred reactants are the benzene polycarboxylic acids such as phthalic acid or anhydride, terephthalic acid, dimethylphthalate, diisobutyltereph-thalate, trimellitic acid, phthaloyldichloride, trimethyl-trimellitate and the like.

The amount of polycarboxylic acid should be an amount sufficient to cross-link enough amine groups to improve the effectiveness of the amidated copolymers in lubricant compositions. In general, about 0.01-1.5 equivalents of polycarboxylic acid per equivalent of >NH present in the amidated copolymer is useful. A preferred range is about 0.1 to 1.0 equivalents of polycarboxylic acid per equivalent of >NH residue in the amidated copolymer.

An equivalent of polycarboxylic acid is one mole divided by the number of carboxyl groups which are in acid, ester or acid halide form capable of reacting with amines to form amides.

Coupling of the amidated copolymer by reaction with the polycarboxylic acid type compound can be carried out by mixing the polycarboxylic type compound with the amidated copolymer and heating the mixture to a temperature sufficient to cause reaction to form amide bonds, but not so high as to cause decomposition of the reactants or product. A useful temperature range for this reaction is about 100°-300° C. A preferred temperature range is about 150°-250° C.

The reaction may be conducted under an air atmosphere but is preferably conducted under an inert gas such as nitrogen. The reaction proceeds at atmospheric pressure, but can be operated at reduced pressure to aid in removal of water or alcohol resulting from amide formation.

The final product can be washed if desired to remove water soluble impurities. If an acid halide had been used as the carboxylic acid compound the wash will remove hydrogen halide resulting from such reaction. In this latter case, the wash is preferably alkaline such as aqueous sodium carbonate.

The following examples serve to illustrate the manner according to which the present additives are made.

EXAMPLE 1

Preparation of Copolymer

A solution of 68.6 grams (0.25 mole) of mono-alkene and 18.5 grams (0.063 mole) of methyloleate was cooled to 0°-5° C. and 10.1 grams (0.188 mole) of 1,3-butadiene was added to it. The mono-alkene used was a 19.5 weight percent paraffin and 78.6 weight percent mono-olefin which consisted mainly of $C_{10}$-$C_{26}$ (mainly $C_{12-18}$) monoolefins which were 12.6 mole percent linear alpha-olefins, 35.7 mole percent branched chain vinylidene olefin and 51.7 mole percent internal olefin.

A second solution of 15 grams of $AlCl_3$ in 300 grams of ethyl chloride was prepared at 0° C.

The two solutions were added concurrently to a stirred reaction vessel. Addition took 13 minutes during which time external heat was applied to assist in vaporizing ethyl chloride. The boiling ethyl chloride controlled the reaction temperature (bp 12.3° C.). The reaction was 24° C. at the end of the addition. Then 400 ml of a 50/50 isopropanol/hexane mixture was added and the mixture stirred for 30 minutes. It was then washed with water and the aqueous phase removed. The organic layer was washed with a solution of 35 ml conc HCl in 265 ml water. Finally, the organic layer was washed with water and the product dried over anhydrous magnesium sulfate. Volatiles were stripped from the product at 60° C./2 mm Hg leaving 91.3 grams of oily copolymer.

Amidation of the Copolymer

In a reaction vessel was placed 80.8 grams of the above copolymer and 9.8 grams (0.052 mole) of tetra-ethylene pentamine. The mixture was blanketed with nitrogen and stirred for 3.25 hours at 243°-250° C. during which time a small amount (ca. 2 ml) of volatiles distilled out and was collected. The resultant amidated copolymer was blended with mineral oil to give 140 grams of a solution containing 50 weight percent amidated copolymer. The remainder was the oil diluent and paraffin carried through from the original monoolefin mixture.

Coupling of the Amidated Copolymer

The 140 grams of amidated copolymer solution was placed in a reaction flask. To it was added 10 grams (0.068 mole) of adipic acid and the resultant mixture stirred 2 hours at 200°-210° C. under vacuum (water aspirator). The resultant coupled product weighed 148.5 grams and was diluted with an additional 7.5 grams of SAE-7 mineral oil to maintain a 50% active product.

Other coupled amidated copolymers can readily be prepared following the above general procedure. The following examples illustrate this.

EXAMPLE 2

Place 140 grams of amidated copolymer made as in Example 1 in a reaction flask. To it add 18.1 grams of tetrapropenyl succinic acid and heat the mixture at 200° C. for 2 hours to obtain a coupled copolymer.

In like manner, an aromatic polycarboxylic acid coupled amidated copolymer can be made by using 14.5 grams of dimethylphthalate in place of the tetrapropenyl succinic acid in Example 2.

Similarly, any of the other aliphatic dicarboxylic compounds or aromatic polycarboxylic compounds can be substituted in Example 1 for adipic acid in the manner previously discussed to obtain a coupled admidated copolymer.

The coupled copolymers of this invention are very effective ashless dispersants in lubricating oil. They can be used in both mineral oil and synthetic oils. Examples of such synthetic oils are alkylated benzenes such as octadecyl benzene, olefin oligomers such as decene-1 trimer, synthetic ester lubricants such as di(2-ethylhexyl)adipate, esters of trimethylolpropane with octanoic acid, complex condensation products of pentaerythritol sebacic acid and methanol, and the like.

The lubricant compositions are prepared by blending a dispersant amount of the coupled copolymer in the lubricating oil. Amounts of about 0.1–5 weight percent on an active ingredient basis are useful.

Other conventional additives can be included in the oil such as zinc dialkyldithiophosphates, calcium alkaryl sulfonates, overbased calcium alkaryl sulfonates, magnesium alkaryl sulfonates, VI improvers such as polyalkylmethacrylates, alkylacrylate-vinyl pyrrolidone copolymers (both random and grafted), olefin copolymers such as ethylene-propylene copolymer, ethylene-propylene-butadiene copolymer or hydrogenated butadiene-styrene copolymers, antioxidants such as 4,4'-methylenebis(2,6-di-tert-butylphenol) or α-(dimethylamino)2,6-di-tert-butyl-p-cresol, and other conventional additives.

The following example illustrates a blended oil containing a coupled copolymer of this invention and other conventional additives.

EXAMPLE 3

In a blending vessel place 10,000 gallons of SAE-5 solvent refined mineral oil. To this add 408 kg of a commercial zinc dialkyldithiophosphate (8.3% zinc), 850 kg of a commercial overbased calcium alkaryl sulfonate (300 base number), and 4767 kg of a commercial ethylene propylene copolymer VI improver and 1702 kg of the coupled copolymer of Example 1. Stir the mixture until homogeneous, filter and package for use in internal combustion engines.

It is expected that the coupled copolymer would be useful as a detergent in distillate fuels for maintaining clean carburetors and intake systems in gasoline-fueled internal combustion engines and for maintaining clean injectors in diesel engines. In such use they should be added to the gasoline, diesel fuel or other distillate fuels in amounts of from about 10–200 ppm.

Tests have been carried out which show that the present coupled copolymer is an effective dispersant in lubricating oil. In this test a mineral lubricating oil was formulated to contain a commercial zinc dialkyldithiophosphate, a calcium alkaryl sulfonate, a commercial viscosity index improver and other conventional additives. The commercial ashless dispersant usually included in the formulation was replaced with 2.4 weight percent of the additive of Example 1.

The oil was placed in the sump of a gasoline engine and subject to a low temperature dispersancy test. In this test the engine is operated on a controlled cycle and at intervals it is opened up so that various internal parts can be rated for cleanliness on a scale from 0 to 10 (10 = clean). Parts are rated for both sludge and varnish contamination. The test's criteria are the hours to a No. 9 rating on both sludge and varnish. In this test the sludge rating of the Example 1 additive was 92 hours and the varnish rating was 83 hours which are good ratings demonstrating that the additive is an effective dispersant.

I claim:

1. An oil soluble lubricating oil dispersant which is made by:
    (A) copolymerizing a mixture of
        (i) about 3–55 mole percent of a material having the formula

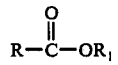

wherein R is an olefinically unsaturated hydrocarbon radical of up to 25 carbon atoms in which the carboxyl group is separated from all olefinic bonds by at least two carbon atoms and $R_1$ is selected from the group consisting of hydrogen and alkyl radicals containing 1 to about 15 carbon atoms,
        (ii) about 5 to 80 mole percent of a conjugated diethylenically unsaturated aliphatic hydrocarbon of 4 to about 12 carbon atoms, and
        (iii) about 92 to 15 mole percent of a monoalkene of 3 to about 30 carbon atoms, said material and said monoalkene being selected such that the total number of carbon atoms in these compounds is at least 12, said copolymerization being conducted at a temperature of about 0°–50° C. to form an intermediate copolymer,
    (B) reacting said intermediate copolymer with at least 1.1 equivalents of a hydrocarbyl polyamine containing 2 to about 12 carbon atoms and from about 2 to about 7 amine nitrogen atoms at a temperature of about 60°–320° C. to form an amidated copolymer which contains unreacted >NH and then
    (C) coupling said unreacted >NH by reaction at about 100°–300° C. with about 0.01–1.5 equivalents of a polycarboxylic acid per equivalent of said >NH group, said polycarboxylic acid being selected from the group consisting of
        (i) aliphatic dicarboxylic acid, and
        (ii) aromatic polycarboxylic acid containing an aryl group of about 6–10 carbon atoms and having 2 to 3 carboxylic groups bonded to said aryl group, said aliphatic dicarboxylic acid and aromatic polycarboxylic acid including precursor compound which yield said aliphatic dicarboxylic acid and said aromatic polycarboxylic acid under reaction conditions.

2. A dispersant of claim 1 wherein said material is an alkyl ester of oleic acid.

3. A dispersant of claim 1 wherein said diethylenically unsaturated aliphatic hydrocarbon is butadiene.

4. A dispersant of claim 1 wherein said diethylenically unsaturated aliphatic hydrocarbon is isoprene.

5. A dispersant of claim 1 wherein said mono-alkene comprises about 20 to 100 mole percent mono-1-alkenes, the remainder of the mono-alkenes being internal mono-alkenes.

6. A dispersant of claim 5 wherein said mono-alkene comprises at least 35 mole percent mono-1-alkenes.

7. A dispersant of claim 5 wherein said mono-alkene is a mixture comprising mono-alkenes containing about 12 to 26 carbon atoms.

8. A dispersant of claim 1 wherein said polyamine is a $C_{2-4}$ alkylene polyamine containing from 1 to about 6 alkylene units and about 2 to 7 amine groups, each of said alkylene units being bonded to 2 amine groups.

9. A dispersant of claim 1 wherein said polycarboxylic acid is a saturated aliphatic dicarboxylic acid selected from the group consisting of oxalic acid, malonic acid, succinic acid, glutaric acid, adipic acid, pimelic acid, suberic acid, azelaic acid and sebacic acid including their anhydrides, ester and acid halides thereof which react to yield substantially the same product.

10. A dispersant of claim 9 wherein said aliphatic dicarboxylic acid is an alkenyl succinic acid or an anhydride, ester or acid halide thereof, said alkenyl group having a molecular weight of from about 50 to 5000.

11. A dispersant of claim 2 wherein said diethylenically unsaturated hydrocarbon is butadiene.

12. A dispersant of claim 11 wherein said mono-alkene comprises about 20 to 100 mole percent mono-1-alkenes, the remainder of the mono-alkenes being internal mono-alkenes.

13. A dispersant of claim 12 wherein said mono-alkene is a mixture comprising mono-alkenes containing about 12 to 26 carbon atoms.

14. A dispersant of claim 13 wherein said polyamine is selected from the group consisting of ethylene diamine, diethylene triamine, triethylene tetramine, tetraethylene pentamine, pentaethylenehexamine, and mixtures thereof.

15. A dispersant of claim 14 wherein said polycarboxylic acid is an aliphatic dicarboxylic acid containing about 4 to 10 carbon atoms.

16. A dispersant of claim 15 wherein said dicarboxylic acid is succinic acid or its anhydride, ester or acid halide.

17. A dispersant of claim 15 wherein said dicarboxylic acid is adipic acid or its anhydride, ester or acid halide.

18. A lubricating oil composition containing a dispersant amount of an oil soluble dispersant of claim 1.

* * * * *